(12) United States Patent
Dawson et al.

(10) Patent No.: US 7,707,288 B2
(45) Date of Patent: Apr. 27, 2010

(54) AUTOMATICALLY BUILDING A LOCALLY MANAGED VIRTUAL NODE GROUPING TO HANDLE A GRID JOB REQUIRING A DEGREE OF RESOURCE PARALLELISM WITHIN A GRID ENVIRONMENT

(75) Inventors: Christopher James Dawson, Arlington, VA (US); Rick Allen Hamilton, II, Charlottesville, VA (US); Steven Jay Lipton, Flower Mound, TX (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 1468 days.

(21) Appl. No.: 11/031,542

(22) Filed: Jan. 6, 2005

(65) Prior Publication Data

US 2006/0149842 A1     Jul. 6, 2006

(51) Int. Cl.
    *G06F 15/173* (2006.01)

(52) U.S. Cl. .................. 709/226; 709/224; 718/104

(58) Field of Classification Search ................ 709/226, 709/224; 718/104
See application file for complete search history.

(56) References Cited

U.S. PATENT DOCUMENTS 4,591,980 A    5/1986  Huberman et al. ............ 712/16

(Continued)

FOREIGN PATENT DOCUMENTS

EP           0790559 A     8/1997

(Continued)

OTHER PUBLICATIONS

Cao et al., "GridFlow: workflow management for Grid computing", Cluster Computing and the Grid, 2003. Proceedings. CCGrid 2003. 3rd IEEE/ACM International Symposium on: Publication Date May 12-15, 2003.*

(Continued)

*Primary Examiner*—Vivek Srivastava
*Assistant Examiner*—William J Goodchild
(74) *Attorney, Agent, or Firm*—William H. Steinberg; Amy J. Pattillo (57) ABSTRACT

A method, system, and program for automatically building a locally managed virtual node grouping to handle a grid job requiring a degree of resource parallelism for execution within a grid environment are provided. The grid environment includes multiple resource nodes which are identified by physical location as physically disparate groups each managed by a grid manager. The grid managers include a grid virtual node grouping subsystem that enables a particular grid manager receiving a grid job that requires a particular degree of resource parallelism for execution to build a virtual node grouping of resources from across the grid environment and locally manage the resources included in the virtual node grouping. In particular, the particular grid manager accesses, from the other grid managers, a current availability and workload of each of the physically disparate resource nodes. The particular grid manager selects a selection of resource nodes to build into a virtual node grouping for executing the grid job. The virtual node grouping is built by the other grid managers enabling the particular grid manager to acquire temporary management control over the selection of resource nodes for a duration of the execution of the grid job within the virtual node grouping.

9 Claims, 6 Drawing Sheets

U.S. PATENT DOCUMENTS

| | | | |
|---|---|---|---|
| 5,220,674 A | 6/1993 | Morgan et al. | |
| 5,325,525 A | 6/1994 | Shan et al. | 718/104 |
| 5,416,840 A | 5/1995 | Cane et al. | 705/52 |
| 5,630,156 A | 5/1997 | Privat et al. | 712/14 |
| 5,640,569 A | 6/1997 | Miller et al. | |
| 5,729,472 A | 3/1998 | Seiffert et al. | |
| 5,884,046 A | 3/1999 | Antonov | |
| 5,905,975 A | 5/1999 | Ausubel | |
| 5,931,911 A | 8/1999 | Remy et al. | 709/223 |
| 5,978,583 A | 11/1999 | Ekanadham et al. | 717/106 |
| 6,003,075 A | 12/1999 | Arendt et al. | |
| 6,021,398 A | 2/2000 | Ausubel | |
| 6,023,612 A | 2/2000 | Harris et al. | |
| 6,049,828 A | 4/2000 | Dev et al. | |
| 6,064,810 A | 5/2000 | Raad et al. | 703/23 |
| 6,067,580 A | 5/2000 | Aman | 719/33 |
| 6,119,186 A | 9/2000 | Watts et al. | |
| 6,154,787 A | 11/2000 | Urevig et al. | |
| 6,167,445 A | 12/2000 | Gai et al. | |
| 6,310,889 B1 | 10/2001 | Parsons et al. | |
| 6,324,656 B1 | 11/2001 | Gleichauf | 714/37 |
| 6,356,909 B1 | 3/2002 | Spencer | 707/10 |
| 6,370,565 B1 | 4/2002 | Van Gong | 709/205 |
| 6,418,462 B1 | 7/2002 | Xu | 709/201 |
| 6,430,711 B1 * | 8/2002 | Sekizawa | 714/47 |
| 6,438,704 B1 | 8/2002 | Harris et al. | 713/502 |
| 6,452,692 B1 | 9/2002 | Yacoub | |
| 6,453,376 B1 | 9/2002 | Fairman et al. | 710/240 |
| 6,463,454 B1 | 10/2002 | Lumelsky et al. | |
| 6,470,384 B1 | 10/2002 | O'Brien et al. | |
| 6,480,955 B1 | 11/2002 | DeKoning et al. | |
| 6,552,813 B2 | 4/2003 | Yacoub | |
| 6,560,609 B1 | 5/2003 | Frey et al. | |
| 6,564,377 B1 | 5/2003 | Jayasimha et al. | 717/174 |
| 6,567,935 B1 | 5/2003 | Figueroa | 714/37 |
| 6,578,160 B1 | 6/2003 | MacHardy et al. | |
| 6,597,956 B1 | 7/2003 | Aziz et al. | 700/3 |
| 6,606,602 B1 | 8/2003 | Kolls | |
| 6,625,643 B1 | 9/2003 | Colby et al. | |
| 6,647,373 B1 | 11/2003 | Carlton-Foss | |
| 6,654,759 B1 | 11/2003 | Brunet et al. | |
| 6,654,807 B2 | 11/2003 | Farber et al. | |
| 6,671,676 B1 | 12/2003 | Shacham | 705/37 |
| 6,681,251 B1 | 1/2004 | Leymann et al. | 709/226 |
| 6,701,342 B1 | 3/2004 | Bartz et al. | |
| 6,714,987 B1 | 3/2004 | Amin et al. | |
| 6,717,694 B1 | 4/2004 | Fukunaga et al. | |
| 6,735,200 B1 | 5/2004 | Novaes | 370/390 |
| 6,748,416 B2 | 6/2004 | Carpenter et al. | 709/202 |
| 6,816,905 B1 | 11/2004 | Sheets et al. | |
| 6,941,865 B2 | 9/2005 | Kato | |
| 6,954,739 B1 | 10/2005 | Boillet et al. | |
| 6,963,285 B2 | 11/2005 | Fischer et al. | |
| 7,050,184 B1 | 5/2006 | Miyamoto | |
| 7,055,052 B2 | 5/2006 | Chalasani et al. | |
| 7,080,077 B2 | 7/2006 | Ramamurthy et al. | |
| 7,093,259 B2 | 8/2006 | Pulsipher et al. | |
| 7,096,248 B2 | 8/2006 | Masters et al. | |
| 7,123,375 B2 | 10/2006 | Nobutani et al. | |
| 7,124,062 B2 | 10/2006 | Gebhart | |
| 7,171,654 B2 | 1/2007 | Werme et al. | |
| 7,181,302 B2 | 2/2007 | Bayne et al. | |
| 7,181,743 B2 | 2/2007 | Werme et al. | |
| 7,243,121 B2 | 7/2007 | Neiman et al. | |
| 7,243,147 B2 | 7/2007 | Hodges et al. | |
| 7,245,584 B2 | 7/2007 | Goringe et al. | |
| 7,272,732 B2 | 9/2007 | Farkas et al. | |
| 7,283,935 B1 | 10/2007 | Pritchard et al. | |
| 7,293,092 B2 | 11/2007 | Sukegawa | |
| 7,340,654 B2 | 3/2008 | Bigagli et al. | |
| 7,426,267 B1 | 9/2008 | Caseau | |
| 7,433,931 B2 | 10/2008 | Richoux | |
| 7,437,675 B2 | 10/2008 | Casati et al. | |
| 7,451,106 B1 | 11/2008 | Gindlesperger | |
| 7,472,112 B2 | 12/2008 | Pfeiger et al. | |
| 7,533,168 B1 | 5/2009 | Pabla et al. | |
| 7,552,437 B2 | 6/2009 | Di Luoffo et al. | |
| 7,562,143 B2 | 7/2009 | Fellenstein et al. | |
| 7,584,274 B2 | 9/2009 | Bond et al. | |
| 2002/0023168 A1 | 2/2002 | Bass et al. | |
| 2002/0057684 A1 | 5/2002 | Miyamoto et al. | 370/386 |
| 2002/0072974 A1 | 6/2002 | Pugliese et al. | |
| 2002/0103904 A1 | 8/2002 | Hay | 709/225 |
| 2002/0116488 A1 | 8/2002 | Subramanian et al. | |
| 2002/0152305 A1 | 10/2002 | Jackson et al. | |
| 2002/0171864 A1 | 11/2002 | Sesek | |
| 2002/0188486 A1 | 12/2002 | Gil et al. | |
| 2003/0011809 A1 | 1/2003 | Suzuki et al. | |
| 2003/0036886 A1 | 2/2003 | Stone | |
| 2003/0041010 A1 | 2/2003 | Yonao-Cowan | |
| 2003/0058797 A1 | 3/2003 | Izmailov et al. | |
| 2003/0088671 A1 | 5/2003 | Klinker et al. | |
| 2003/0101263 A1 | 5/2003 | Bouillet et al. | |
| 2003/0108018 A1 | 6/2003 | Dujardin et al. | |
| 2003/0112809 A1 | 6/2003 | Bharali et al. | 370/400 |
| 2003/0115099 A1 | 6/2003 | Burns et al. | 705/14 |
| 2003/0126240 A1 | 7/2003 | Vosseler | |
| 2003/0126265 A1 | 7/2003 | Aziz et al. | |
| 2003/0140143 A1 | 7/2003 | Wolf et al. | |
| 2003/0145084 A1 | 7/2003 | McNerney | 709/224 |
| 2003/0161309 A1 | 8/2003 | Karuppiah | |
| 2003/0195813 A1 | 10/2003 | Pallister et al. | |
| 2003/0204485 A1 | 10/2003 | Triggs | 707/1 |
| 2003/0204758 A1 | 10/2003 | Singh | |
| 2003/0212782 A1 | 11/2003 | Canali et al. | |
| 2004/0003077 A1 | 1/2004 | Bantz et al. | 709/224 |
| 2004/0064548 A1 | 4/2004 | Adams et al. | 709/224 |
| 2004/0078471 A1 | 4/2004 | Yang | 709/227 |
| 2004/0095237 A1 | 5/2004 | Chet et al. | |
| 2004/0098606 A1 | 5/2004 | Tan et al. | |
| 2004/0103339 A1 | 5/2004 | Chalasani et al. | |
| 2004/0145775 A1 | 7/2004 | Kubler et al. | |
| 2004/0213220 A1 | 10/2004 | Davis | |
| 2004/0215590 A1 | 10/2004 | Kroening | |
| 2004/0225711 A1 | 11/2004 | Burnett et al. | |
| 2005/0021349 A1 | 1/2005 | Chiliotis et al. | |
| 2005/0021742 A1 | 1/2005 | Yemini et al. | |
| 2005/0027691 A1 | 2/2005 | Brin et al. | |
| 2005/0027865 A1 | 2/2005 | Bozak et al. | |
| 2005/0044228 A1 | 2/2005 | Birkestrand et al. | |
| 2005/0065994 A1 | 3/2005 | Creamer et al. | |
| 2005/0108394 A1 | 5/2005 | Braun et al. | |
| 2005/0120160 A1 | 6/2005 | Plouffe et al. | |
| 2005/0132041 A1 | 6/2005 | Kundu | |
| 2005/0138162 A1 | 6/2005 | Byrnes | |
| 2005/0138175 A1 | 6/2005 | Kumar et al. | |
| 2005/0182838 A1 | 8/2005 | Sheets et al. | |
| 2005/0187797 A1 | 8/2005 | Johnson | |
| 2005/0187977 A1 | 8/2005 | Frost | |
| 2005/0283788 A1 | 12/2005 | Bigagli et al. | |
| 2006/0064698 A1 | 3/2006 | Miller et al. | |
| 2006/0069621 A1 | 3/2006 | Chang et al. | |
| 2006/0075041 A1 | 4/2006 | Antonoff et al. | |
| 2006/0075042 A1 | 4/2006 | Wang et al. | |
| 2006/0288251 A1 | 12/2006 | Jackson | |
| 2006/0294218 A1 | 12/2006 | Tanaka et al. | |

FOREIGN PATENT DOCUMENTS

| | | |
|---|---|---|
| EP | 1267552 A | 12/2002 |

OTHER PUBLICATIONS

Moore et al., "Managing Mixed Use Clusters with Cluster on Demand", Duke University, Nov. 2002.*

Tcherevik, Dmitri; Managing the Service-Oriented Architecture (SOA) and On-Demand Computing; copyright 2004 Computer Associates International, Inc., pp. 1-11.
Foster et al.; The Anatomy of the Grid, Enabling Scalable Virtual Organizations; available at www.globus.org/research/papers/anatomy.pdf as of Nov. 27, 2003.
Foster et al.; The Physiology of the Grid, An Open Grid Services Architecture for Distributed Systems Integration; avaliable at www.globus/org/research/papers/ogsa.pdf as Nov. 27, 2003.
Foster, Ian; What is the Grid? A Three Point Checklist; available at www-fp.mcs.anl.gov/~foster/Articles/WhatIsTheGrid.pdf as of Nov. 27, 2003.
Ferreira et al.; IBM Redpaper—Globus Toolkit 3.0 Quick Start; available at www.redbooks.ibm.com/redpapers/pdfs/redp369 as Nov. 27, 2003.
IBM Grid Computing—What is Grid Computing; available at www-1.ibm.com/grid/about_grid/what_is.shtml as of Nov. 27, 2003.
Berstis, Viktors; IBM Redpaper—Fundamentals of Grid Computing; available at www.redbooks.ibm.com/redpapers/pdfs/redp3613.pdf as of Nov. 27, 2003.
Jacob, Bart; IBM Grid Computing—Grid Computing: What are the key components?; availabe at www-106.ibm.com/developerworks/grid/library/gr-overview/ as of Nov. 27, 2003.
Unger et al.; IBM Grid Computing—A Visual Tour of Open Grid Services Architecture; available at www-106.ibm.com/developerworks/grid/library/gr-visual/ as of Nov. 27, 2003.
Edited by Rajkumar Buyya; Grid Computing Info Centre: Frequently Asked Questions (FAQ); available at http://www.cs.mu.oz.au/~raj/GridInfoware/gridfaq.html as of Nov. 27, 2003.
Al-Theneyan, Ahmed Hamdan, "A Policy-Based Resource Brokering Environment for Computational Grids" (2002) PHD Dissertation, Old Dominion University, United States—Virginia.
Leff, Avraham, "Service Level Agreements and Commercial Grids", IEEE Internet Computing (Jul.-Aug. 2003): pp. 44-50.
Hill, J.R. "A Management Platform for Commercial Web Services" BT Technology Journal (Jan. 2004): vol. 22, No. 1, pp. 52-62).
Alexander Keller and Heiko Ludwig, "The WSLA Framework: Specifying and Monitoring Service Level Agreements for Web Services." Journal of Network and Systems Management, vol. 11, No. 1, March 2003, pp. 57-81.
Menasce, Daniel A, "QOS in Grid Computing", IEEE Internet Computing (Jul.-Aug. 2004), pp. 85-87.
T Boden, "The Grid Enterprise—Structuring the Agile Business of the Future." BT Technology Journal, vol. 22, No. 1, Jan. 2004, pp. 107-117.
USPTO Office Action, U.S. Appl. No. 11/031,403, Mailing Date Oct. 24, 2008, 19 Pages.
Rolia, Jerry et al, "Service Centric Computing—Next Generation Internet Computing", 2002, Springer-Verlag Berlin Heidelberg, pp. 463-479.
Belloum, Adam et al, "VLAM-G: a grid-based virtual laboratory", 2002, Future Generation Computer Systems 19, Elsevier Science B.V., pp. 209-217.
Min, D. and Mutka, M., "Efficient Job Scheduling in a Mesh Multicomputer Without Discrimination Against Large Jobs", 1995, IEEE., pp. 52-59.
Massie ML et al, "The Ganglia Distributed Monitoring System: Design, Implementation, and Experience" Parallel Computing Elsevier Netherlands, vol. 30, No. 7, Jul. 2004, pp. 817-840.
Fenglian Xu et al, "Tools and Support for Deploying Applications on the Grid" Services Computing, 2004. Proceedings 2004 International Conference on Shanghai, China, Sep. 15-18, 2004, Piscataway, NJ, IEEE, pp. 281-287.
Smallen S et al, "The Inca Test Harness and Reporting Framework" Supercomputing 2004. Proceedings of the ACM/IEEE SC2004 Conference Pittsburgh, PA, Nov. 2004, p. 1-10.
Allen G, et al, "The Cactus Worm: Experiments with Dynamic Resource Discovery and Allocation in a Grid Environment", International Journal of High Performance Computing Applications, Sage Science Press, Thousand Oaks, US, vol. 15, No. 4, 2001, pp. 345-358.
Hwa Min Lee, "A Fault Tolerance Service for QoS in Grid Computing", Lecture Notes in Computer Science, vol. 2659, Aug. 2003, pp. 286-296.

Tianyi Zang, et al, "The Design and Implementation of an OGSA-based grid information service" Web Services, 2004. Proceedings IEEE International Conference on San Diego CA, Piscataway, NJ, IEEE, Jul. 6, 2004, pp. 566-573.
Sample N, et al, "Scheduling Under Uncertainty: Planning for the Ubiquitous Grid", Coordination Models and Languages, 5th International Conference, Coordination 2002. Proceedings (Lecture Notes in Computer Science, vol. 2315) Springer-Varlag Berlin, Germany, 2002, pp. 300-316.
Gever DH, et al, "WWW-based high performance computing support of acoustic matched field processing", MTS/IEEE Oceans 2001. An Ocean Odessey. Conference Proceedings (IEEE Cat. No. 01CH37295) Marine Technology Soc. Washington, DC, vol. 4, 2001, pp. 2541-2548.
Ding et al., "An Agent Model for Managing Distributed Software Resources in Grid Environment", 2003, ICCS, LNCS 2658, pp. 971-980.
U.S. Appl. No. 11/031,490, filed Jan. 6, 2005, Fellenstein et al.
U.S. Appl. No. 11/031,541, filed Jan. 6, 2005, Fellenstein et al.
U.S. Appl. No. 11/031,543, filed Jan. 6, 2005, Fellenstein et al.
U.S. Appl. No. 11/031,489, filed Jan. 6, 2005, Fellenstein et al.
U.S. Appl. No. 11/031,403, filed Jan. 6, 2005, Ernest et al.
U.S. Appl. No. 11/031,426, filed Jan. 6, 2005, Gusler et al.
U.S. Appl. No. 11/031,427, filed Jan. 6, 2005, Fellenstein et al.
Office Action, U.S. Appl. No. 11/031,403, filed Jan. 6, 2005, Mailed Apr. 24, 2009.
Office Action, U.S. Appl. No. 11/031,426, filed Jan. 6, 2005, Mailed Apr. 1, 2009.
Notice of Allowance, U.S. Appl. No. 10/868,542, filed Jun. 15, 2004, Mailed Apr. 16, 2009.
Office Action, U.S. Appl. No. 11/767,502, filed Jun. 23, 2007, Zhendong Bao, Mailed Jun. 25, 2009, pp. 1-14.
Weng et al, "A cost-based online scheduling algorithm for job assignment on computational grids", Springer-Verlag Berlin Heidelberg, 2003, pp. 343-351.
Andrade et al, "Our grid: An approach to easily assemble grids with equitable resource sharing", Springer-Verlag Berlin Heidelberg, 2003, pp. 61-86.
Chase, JS et al, "Dynamic Virtual Clusters in a Grid Site Manager," High Performance Distributed Computing 2003. Proceedings, 12th IEEE International Symposium, Jun. 22-24, 2003, Piscataway, NJ USA, IEEE, pp. 90-100.
Office Action, U.S. Appl. No. 10/940,452, filed Sep. 14, 2004, Craig Fellenstein, Mailed Jun. 23, 2009, pp. 1-13.
Office Action, U.S. Appl. No. 12/211,243, filed Sep. 16, 2008, Di Luoffo et al, Mailed Aug. 12, 2009, p. 1-18.
USPTO Office Action Response in pending U.S. Appl. No. 11/031,490, filed Jan. 6, 2005, Craig William Fellenstein et al, Mailing date: May 29, 2009, 10 pages.
"The DataGrid Workload Management System: Challenges and Results", Journal of Grid Computing, Springer Netherlands, ISSN 1570-7873 (Print) 1572-9814 (Online), vol. 2, No. 4, Dec. 2004, pp. 353-367.
"IBM Girds for Grids". McConnell, Chris. Enterprise System Journal, Oct. 2001, 1 page.
"Grid Computing set for big growth". Tanner, John, America's Network, vol. 107, No. 8, May 15, 2003, 6 pages.
Office Action, U.S. Appl. No. 12/125,892, filed May 22, 2008, mailed Aug. 26, 2009.
Office Action, U.S. Appl. No. 12/125,879, filed May 22, 2008, mailed Sep. 15, 2009.
Notice of Allowance, U.S. Appl. No. 12/194,989, filed Aug. 20, 2009. mailed Sep. 30, 2009.
Office Action, U.S. Appl. No. 11/031,426, Filed Jan. 6, 2005, Carl Philip Gusler et al., Mailed Nov. 13, 2009, 21 pages.
Notice of Allowance, U.S. Appl. No. 11/031,403, Filed Jan. 6, 2005, Leslie Mark Ernest et al., Mailed Oct. 5, 2009, 15 pages.
In re Vincent Valentino Di Luoffo, Notice of Allowance, U.S. Appl. No. 12/211,243, filed Sep. 16, 2003, mail date Dec. 31, 2009, 18 pages.
In re Fellenstein, Final Office Action, U.S. Appl. No. 11/031,490, filed Jan. 6, 2005, mail date Dec. 28, 2009, 21 pages.

In re Fellenstein, Notice of Allowance, U.S. Appl. No. 12/364,469, filed Feb. 2, 2009, mail date Jan. 5, 2010, 27 pages.
In re Fellenstein, Supplemental Notice of Allowance, U.S. Appl. No. 12/364,469, filed Feb. 2, 2009, mail date Jan. 19, 2010, 7 pages.

In re Fellenstein, Notice of Allowance, U.S. Appl. No. 10/940,452, filed Sep. 14, 2004, mail date Dec. 16, 2009, 28 pages.

* cited by examiner

AUTOMATICALLY BUILDING A LOCALLY MANAGED VIRTUAL NODE GROUPING TO HANDLE A GRID JOB REQUIRING A DEGREE OF RESOURCE PARALLELISM WITHIN A GRID ENVIRONMENT

CROSS-REFERENCE TO RELATED APPLICATIONS

The present application is related to the following co-pending application:
(1) U.S. patent application Ser. No. 11/031,543, filed Jan. 6, 2005 with common inventors Rick Allen Hamilton II and James W. Seaman.

BACKGROUND OF THE INVENTION

1. Technical Field

The present invention relates in general to improved grid computing and in particular to constructing virtual node groupings to handle a grid job. Still more particularly, the present invention relates to providing automated building of a locally managed virtual node grouping to handle a grid job requiring a degree of resource parallelism for execution within a grid environment.

2. Description of the Related Art

Ever since the first connection was made between two computer systems, new ways of transferring data, resources, and other information between two computer systems via a connection continue to develop. In typical network architectures, when two computer systems are exchanging data via a connection, one of the computer systems is considered a client sending requests and the other is considered a server processing the requests and returning results. In an effort to increase the speed at which requests are handled, server systems continue to expand in size and speed. Further, in an effort to handle peak periods when multiple requests are arriving every second, server systems are often joined together as a group and requests are distributed among the grouped servers. Multiple methods of grouping servers have developed such as clustering, multi-system shared data (sysplex) environments, and enterprise systems. With a cluster of servers, one server is typically designated to manage distribution of incoming requests and outgoing responses. The other servers typically operate in parallel to handle the distributed requests from clients. Thus, one of multiple servers in a cluster may service a client request without the client detecting that a cluster of servers is processing the request.

Typically, servers or groups of servers operate on a particular network platform, such as Unix or some variation of Unix, and provide a hosting environment for running applications. Each network platform may provide functions ranging from database integration, clustering services, and security to workload management and problem determination. Each network platform typically offers different implementations, semantic behaviors, and application programming interfaces (APIs).

Merely grouping servers together to expand processing power, however, is a limited method of improving efficiency of response times in a network. Thus, increasingly, within a company network, rather than just grouping servers, servers and groups of server systems are organized as distributed resources. There is an increased effort to collaborate, share data, share cycles, and improve other modes of interaction among servers within a company network and outside the company network. Further, there is an increased effort to outsource nonessential elements from one company network to that of a service provider network. Moreover, there is a movement to coordinate resource sharing between resources that are not subject to the same management system, but still address issues of security, policy, payment, and membership. For example, resources on an individual's desktop are not typically subject to the same management system as resources of a company server cluster. Even different administrative groups within a company network may implement distinct management systems.

The problems with decentralizing the resources available from servers and other computing systems operating on different network platforms, located in different regions, with different security protocols and each controlled by a different management system, has led to the development of Grid technologies using open standards for operating a grid environment. Grid environments support the sharing and coordinated use of diverse resources in dynamic, distributed, virtual organizations. A virtual organization is created within a grid environment when a selection of resources, from geographically distributed systems operated by different organizations with differing policies and management systems, is organized to handle a job request.

While the open standards defining grid technology facilitate sharing and coordination of diverse resources in dynamic, distributed, virtual organizations, grid standards do not solve all of the problems associated with actually determining how to group resources into virtual organizations. This problem is further compounded when a grid job requires groups of resources that are dedicated to processing the grid job in parallel. In some cases, a system administrator may decide to build a group of grid resource nodes dedicated to highly parallel job processing, but dedicating a group of grid resource nodes to provide a particular degree of parallelism limits the use of those resources. In addition, even if a system administrator dedicates a group of resources to highly parallel job processing, that group of resources may be insufficient for the degree of parallelism required for processing a particular job, requiring the grid environment to send the grid job to an external grid environment to handle the grid job. Sending a grid job to an external grid environment with groupings of resource nodes is also limited because use of the external grid environment may be expensive and may not be appropriate or desirable depending on the confidentiality required for the grid job. Further, sending a grid job to an external grid environment with designated groupings of resource nodes is also limited because a company or organization may maintain a grid environment that when viewed as a whole includes sufficient resource nodes to provide the degree of parallelism, but current grid technology does not provide a mechanism for automatically grouping grid nodes from physically disparate locations within a company or organization to process jobs requiring a high degree of parallelism.

Therefore, in view of the foregoing, there is a need for a computer automated method, system, and program for creating virtual, temporary grid node groupings of sufficient capacity to provide the degree of parallelism required for a particular job. In particular, there is a need for a computer automated method, system, and program for creating cost effective virtual node groupings using locally available resources and external resources accessed from trusted grid vendors with local management within the company or organization controlling the grid environment.

SUMMARY OF THE INVENTION

In view of the foregoing, the present invention in general provides for improved grid computing and in particular to constructing virtual node groupings to handle a grid job. Still more particularly, the present invention relates to automated building of a locally managed virtual node grouping to handle a grid job requiring a degree of resource parallelism for execution within a grid environment.

In one embodiment, a grid environment includes multiple resource nodes which are identified by physical location as physically disparate groups each managed by a grid manager. The grid managers include a grid virtual node grouping subsystem that enables a particular grid manager receiving a grid job that requires a particular degree of resource parallelism for execution to build a virtual node grouping of resources from across the grid environment and locally manage the resources included in the virtual node grouping. In particular, the particular grid manager accesses, from the other grid managers, a current availability and workload of each of the physically disparate resource nodes. The particular grid manager selects a selection of resource nodes to build into a virtual node grouping for executing the grid job. The virtual node grouping is built by the other grid managers enabling the particular grid manager to acquire temporary management control over the selection of resource nodes for a duration of the execution of the grid job within the virtual node grouping.

In particular, when the particular grid manager receives a grid job that requires a particular degree of resource parallelism for execution, grid manager first determines whether the local resource nodes managed by the particular grid manager already include a node grouping designated for handling the level of parallelism required. If the local resource nodes do not already include a node grouping designated for handling the level of parallelism, then the particular grid manager determines whether a virtual node grouping can be formed within the local resource nodes, by combining local resource nodes with physically disparate resource nodes, by combining only physically disparate resource nodes, or by accessing resource nodes from a trusted grid vendor outside the grid environment. Any of the virtual node groupings will still be locally managed by the particular grid manager.

In determining the selection of resource nodes to include in the virtual node grouping, the particular grid manager may consider the current availability of resource nodes, the workload currently affecting the performance time of resource nodes, and the cost of each resource node. In addition, the particular grid manager may access business policies for the grid environment and make a policy compliant selection of resource nodes.

BRIEF DESCRIPTION OF THE DRAWINGS

The novel features believed aspect of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
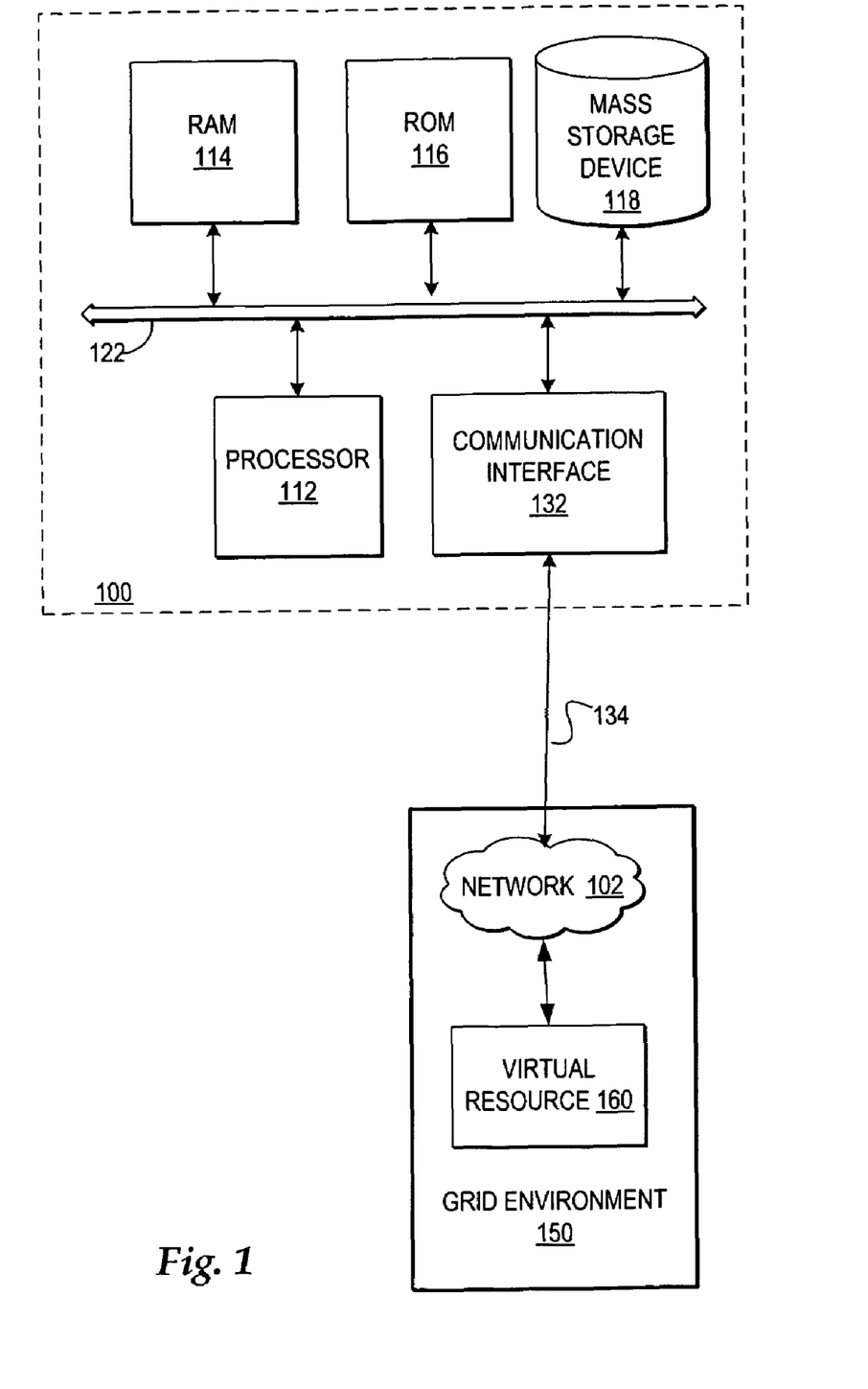
FIG. 1 depicts one embodiment of a computer system which may be implemented in a grid environment and in which the present invention may be implemented.

Referring now to the drawings and in particular to FIG. 1, there is depicted one embodiment of a computer system which may be implemented in a grid environment and in which the present invention may be implemented. As will be further described, the grid environment includes multiple computer systems managed to provide resources. Additionally, as will be further described, the present invention may be executed in a variety of computer systems, including a variety of computing systems, mobile systems, and electronic devices operating under a number of different operating systems managed within a grid environment.

In one embodiment, computer system 100 includes a bus 122 or other device for communicating information within computer system 100, and at least one processing device such as processor 112, coupled to bus 122 for processing information. Bus 122 may include low-latency and higher latency paths connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system may provide a graphical user interface (GUI) to the user. In one embodiment, application software contains machine executable instructions that when executed on processor 112 carry out the operations depicted in the flowcharts of FIGS. 7 and 8 and others operations described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processor 112 or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote virtual resource, such as a virtual resource 160, to requesting computer system 100 by way of data signals embodied in a carrier wave or other propagation medium via a network link 134 (e.g. a modem or network connection) to a communications interface 132 coupled to bus 122. Virtual resource 160 may include a virtual representation of the resources accessible from a single system or systems, wherein multiple systems may each be considered discrete sets of resources operating on independent platforms, but coordinated as a virtual resource by a grid manager. Communications interface 132 provides a two-way data communications coupling to network link 134 that may be connected, for example, to a local area network (LAN), wide area network (WAN), or an Internet Service Provider (ISP) that provide access to network 102. In particular, network link 134 may provide wired and/or wireless network communications to one or more networks, such as network 102, through which use of virtual resources, such as virtual resource 160, is accessible as provided within a grid environment 150. Grid environment 150 may be part of multiple types of networks, including a peer-to-peer network, or may be part of a single computer system, such as computer system 100.

As one example, network 102 may refer to the worldwide collection of networks and gateways that use a particular protocol, such as Transmission Control Protocol (TCP) and Internet Protocol (IP), to communicate with one another. Network 102 uses electrical, electromagnetic, or optical signals that carry digital data streams. The signals through the various networks and the signals on network link 134 and through communication interface 132, which carry the digital data to and from computer system 100, are exemplary forms of carrier waves transporting the information. It will be understood that alternate types of networks, combinations of networks, and infrastructures of networks may be implemented.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

Additionally, although not depicted, multiple peripheral components and internal/external devices may be added to computer system 100, connected to multiple controllers, adapters, and expansion slots coupled to one of the multiple levels of bus 122. For example, a display device, audio device, keyboard, or cursor control device may be added as a peripheral component.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
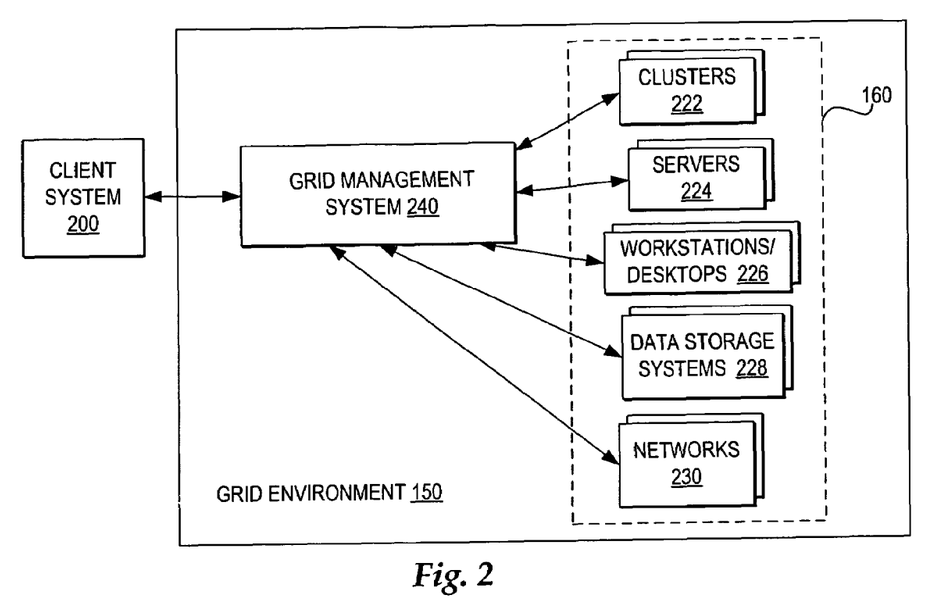
FIG. 2 is block diagram illustrating one embodiment of the general types of components within a grid environment.

With reference now to FIG. 2, a block diagram illustrates one embodiment of the general types of components within a grid environment. In the present example, the components of a grid environment 150 include a client system 200 interfacing with a grid management system 240 which interfaces with server clusters 222, servers 224, workstations and desktops 226, data storage systems 228, and networks 230. For purposes of illustration, the network locations and types of networks connecting the components within grid environment 150 are not depicted. It will be understood, however, that the components within grid environment 150 may reside atop a network infrastructure architecture that may be implemented with multiple types of networks overlapping one another. Network infrastructure may range from multiple large enterprise systems to a peer-to-peer system to a single computer system. Further, it will be understood that the components within grid environment 150 are merely representations of the types of components within a grid environment. A grid environment may simply be encompassed in a single computer system or may encompass multiple enterprises of systems.

It will be understood that grid environment 150 may be provided by a grid vendor, where a cost for use of resources within grid environment 150 may be calculated based on the amount of time required for a grid job to execute or the actual amount of resources used, for example. In addition, it will be understood that grid environment 150 may include grid resources supplied by a single grid vendor, such as a particular business enterprise, or multiple vendors, where each vendor continues to monitor and manage the vendor's group of resources, but grid management system 240 is able to monitor unintended changes across all the resources, regardless of which vendors provide which resources. Further, it will be understood that although resource discovery mechanisms for discovering available grid resources are not depicted, client system 200 or grid management system 240 may discover grid resources advertised from local and global directories available within and outside of grid environment 150.

The central goal of a grid environment, such as grid environment 150 is organization and delivery of resources from multiple discrete systems viewed as virtual resource 160. Client system 200, server clusters 222, servers 224, workstations and desktops 226, data storage systems 228, networks 230 and the systems creating grid management system 240 may be heterogeneous and regionally distributed with independent management systems, but enabled to exchange information, resources, and services through a grid infrastructure enabled by grid management system 240. Further, server clusters 222, servers 224, workstations and desktops 226, data storage systems 228, and networks 230 may be geographically distributed across countries and continents or locally accessible to one another.

In the example, client system 200 interfaces with grid management system 240. Client system 200 may represent any computing system sending requests to grid management system 240. In particular, client system 200 may send virtual job requests (or requests for a quote (RFQs) and jobs to grid management system 240. Further, while in the present embodiment client system 200 is depicted as accessing grid environment 150 with a request, in alternate embodiments client system 200 may also operate within grid environment 150.

While the systems within virtual resource 160 are depicted in parallel, in reality, the systems may be part of a hierarchy of systems where some systems within virtual resource 160 may be local to client system 200, while other systems require access to external networks. Additionally, it is important to note, that systems depicted within virtual resources 160 may be physically encompassed within client system 200.

To implement grid environment 150, grid management system 240 facilitates grid services. Grid services may be designed according to multiple architectures, including, but not limited to, the Open Grid Services Architecture (OGSA). In particular, grid management system 240 refers to the management environment which creates a grid by linking computing systems into a heterogeneous network environment characterized by sharing of resources through grid services.

According to an advantageous of the invention, grid management system 240 includes a grid virtual node grouping service or controller that enables local grid managers within grid management system 240 to build temporary virtual node groupings to handle jobs that require a particular grouping of resources, such as a grouping of resource nodes with sufficient capacity to provide the degree of parallelism required for a particular job. As will be further described, rather than require a grid manager to send a job to another grid environment, outside of grid environment 150, that already has a grouping of dedicated resources to handle the job, grid management system 240 can build the grouping and locally manage the grouping from a grid manager for one of multiple physically disparate grids operating within grid environment 150. Further, as will be further described, the grid virtual node grouping service enables grid management system 240 to build a locally managed, virtual node grouping that includes selections of resources within grid environment 150 and selections of resources from trusted grid vendors outside grid environment 150. Building a virtual node grouping may require initializing hardware resources and installing software resources, for example.

Figure 3:
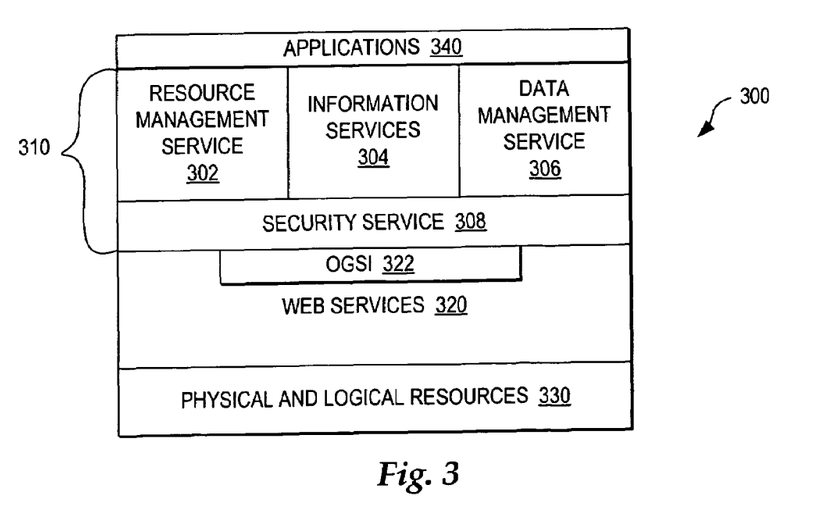
FIG. 3 is a block diagram depicting one example of an architecture that may be implemented in a grid environment.

Referring now to FIG. 3, a block diagram illustrates one example of an architecture that may be implemented in a grid environment. As depicted, an architecture 300 includes multiple layers of functionality. As will be further described, the present invention is a process which may be implemented in one or more layers of an architecture, such as architecture 300, which is implemented in a grid environment, such as the grid environment described in FIG. 2. It is important to note that architecture 300 is just one example of an architecture that may be implemented in a grid environment and in which the present invention may be implemented. Further, it is important to note that multiple architectures may be implemented within a grid environment.

Within the layers of architecture 300, first, a physical and logical resources layer 330 organizes the resources of the systems in the grid. Physical resources include, but are not limited to, servers, storage media, and networks. The logical resources virtualize and aggregate the physical layer into usable resources such as operating systems, processing power, memory, I/O processing, file systems, database managers, directories, memory managers, and other resources.

Next, a web services layer 320 provides an interface between grid services 310 and physical and logical resources 330. Web services layer 320 implements service interfaces including, but not limited to, Web Services Description Language (WSDL), Simple Object Access Protocol (SOAP), and extensible mark-up language (XML) executing atop an Internet Protocol (IP) or other network transport layer. Further, the Open Grid Services Infrastructure (OSGI) standard 322 builds on top of current web services 320 by extending web services 320 to provide capabilities for dynamic and manageable Web services required to model the resources of the grid. In particular, by implementing OGSI standard 322 with web services 320, grid services 310 designed using OGSA are interoperable. In alternate embodiments, other infrastructures or additional infrastructures may be implemented a top web services layer 320.

Grid services layer 310 includes multiple services, where in one embodiment the multiple services interacting with one another implement grid management system 240. For example, grid services layer 310 may include grid services designed using OGSA, such that a uniform standard is implemented in creating grid services. Alternatively, grid services may be designed under multiple architectures. Grid services can be grouped into four main functions. It will be understood, however, that other functions may be performed by grid services.

First, a resource management service 302 manages the use of the physical and logical resources. Resources may include, but are not limited to, processing resources, memory resources, and storage resources. Management of these resources includes scheduling jobs, distributing jobs, and managing the retrieval of the results for jobs. Resource management service 302 monitors resource loads and distributes jobs to less busy parts of the grid to balance resource loads and absorb unexpected peaks of activity. In particular, a user may specify preferred performance levels so that resource management service 302 distributes jobs to maintain the preferred performance levels within the grid.

Second, information services 304 manages the information transfer and communication between computing systems within the grid. Since multiple communication protocols may be implemented, information services 304 manages communications across multiple networks utilizing multiple types of communication protocols.

Third, a data management service 306 manages data transfer and storage within the grid. In particular, data management service 306 may move data to nodes within the grid where a job requiring the data will execute. A particular type of transfer protocol, such as Grid File Transfer Protocol (GridFTP), may be implemented.

Finally, a security service 308 applies a security protocol for security at the connection layers of each of the systems operating within the grid. Security service 308 may implement security protocols, such as Open Secure Socket Layers (SSL), to provide secure transmissions. Further, security service 308 may provide a single sign-on mechanism, so that once a user is authenticated, a proxy certificate is created and used when performing actions within the grid for the user.

Multiple services may work together to provide several key functions of a grid computing system. In a first example, computational tasks are distributed within a grid. Data management service 306 may divide up a computation task into separate grid services requests of packets of data that are then distributed by and managed by resource management service 302. The results are collected and consolidated by data management system 306. In a second example, the storage resources across multiple computing systems in the grid are viewed as a single virtual data storage system managed by data management service 306 and monitored by resource management service 302.

An applications layer 340 includes applications that use one or more of the grid services available in grid services layer 310. Advantageously, applications interface with the physical and logical resources 330 via grid services layer 310 and web services 320, such that multiple heterogeneous systems can interact and interoperate.

Figure 4:
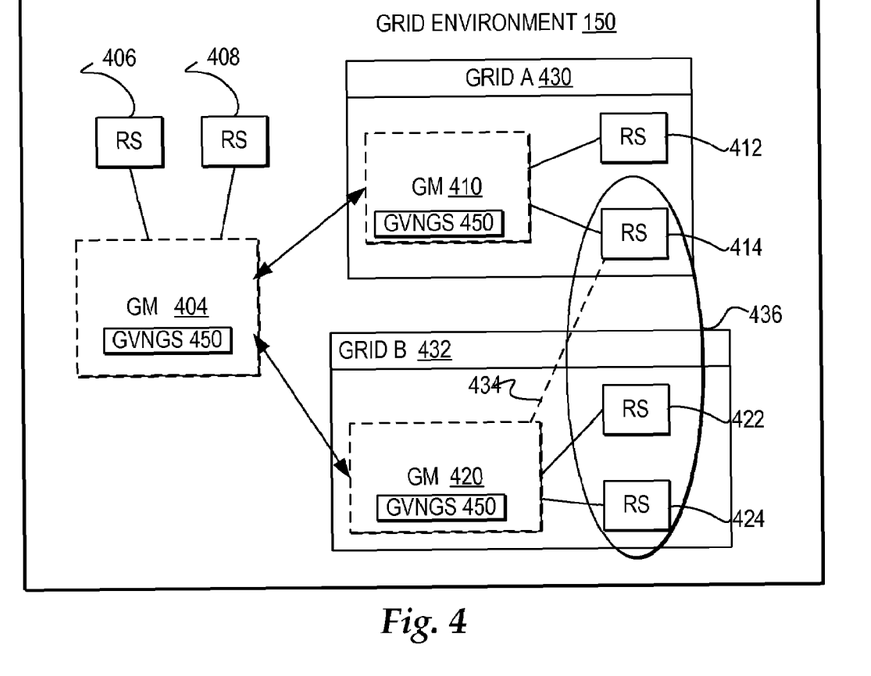
FIG. 4 is a block diagram depicting one illustration of a logical representation of the grid management system within a grid environment.

With reference now to FIG. 4, there is depicted one illustration of a logical representation of the grid management system within a grid environment in accordance with the method, system, and program of the present invention. As depicted, grid management system 240 is logically represented by multiple grid managers 404, 410, and 420, that perform the functions that provide grid management system 240. Each of grid managers 404, 410, and 420 may provide monitoring, scheduling, and management to resource nodes (RS), such as resource nodes 406, 408, 412, 414, 422, and 424. According to an advantage of the invention, each of grid managers 404, 410, and 420 may include a grid virtual node grouping subsystem 450, which enables grid managers 404, 410, and 420 each to build local virtual node groupings to handle jobs that require groupings of resources, such as jobs that require a particular degree of parallelism.

In particular, in the example, grid environment 150 includes GM 404 that manages RS 406 and RS 408 and communicates with GM 410 and GM 420. In particular, grid virtual node grouping subsystem 450, distributed among GM 404, GM 410, and GM 412, enables communication between GM 404, GM 410, and GM 420 to enable each of these GMs to build and manage a local virtual node grouping.

In addition, in the example, grid environment 150 includes multiple groups of resource nodes described by grid A 430 and grid B 432. In one embodiment, Grid A 430 and Grid B 432 are physically disparate groups of resource nodes, but accessible to one another within grid environment 150. For purposes of illustration, where Grid A 430 and grid B 432 are physically disparate groups of resource nodes, each grid may be considered a local grid to a particular physical location; the GM within each grid manages a set of "local" resources. Thus, in particular GM 410, within grid A 430, manages resource nodes 412 and 414, which are physically local to one another and GM 420, within grid B 432, manages resource nodes 422 and 424, which are physically local to one another. In another embodiment, Grid A 430 and Grid B 432 are logically disparate groups of resource nodes.

In addition to GM 404, GM 410, and GM 420 and grid virtual node grouping subsystem 450, grid management system 240 may include additional grid services that facilitate management of grid environment 150 and specifically facilitate management of grids within grid environment 150. For example, in addition to GM 410, grid A 430 may include a grid workload tracking agent (not depicted) that tracks the real-time workload characteristics of RS 412 and RS 414 and any other resource nodes managed by GM 410. In another grid environment 150 may include a central allocation controller (not depicted) that determines how resource nodes should be allocated within grid environment 150 or within a particular grid of grid environment 150. For example, the central allocation controller may detect that more resource nodes need to be allocated for performing database processing and control the allocation process In one example, a job submitted within grid environment 150 is initially received by GM 404. GM 404 determines that the job requires a grid node grouping of sufficient capacity to provide a particular degree of parallelism. In a first scenario, GM 404 locates Grid B 432 within grid environment 150 that has sufficient resources available to provide an execution environment of a sufficient degree of parallelism and passes the job to GM 410. In a second scenario, GM 404 locates Grid B 432 within grid environment 150 that can handle the job, except for requiring an additional resource node. GM 420 negotiates with GM 410 for temporary management of RS 414, as indicated by temporary management connection 434, to build a local virtual node grouping 436 that provides an execution environment of a sufficient degree of parallelism. Alternatively, GM 420 may negotiate for temporary or permanent access to grid resources available from a trusted grid vendor outside of grid environment 150 for building a local virtual node grouping that provides an execution environment of a sufficient degree of parallelism.

GM 404, GM 410, GM 420 and all the RSs may be part of a grid environment of resources all owned by a single enterprise or of resources all managed and owned by a single grid vendor. In another example, grid environment 150 may be the environment in which a single enterprise submits grid jobs, but Grid A 430 and Grid B 432 are accessed from trusted grid vendors and incorporated either temporarily or permanently within grid environment 150.

Figure 5:
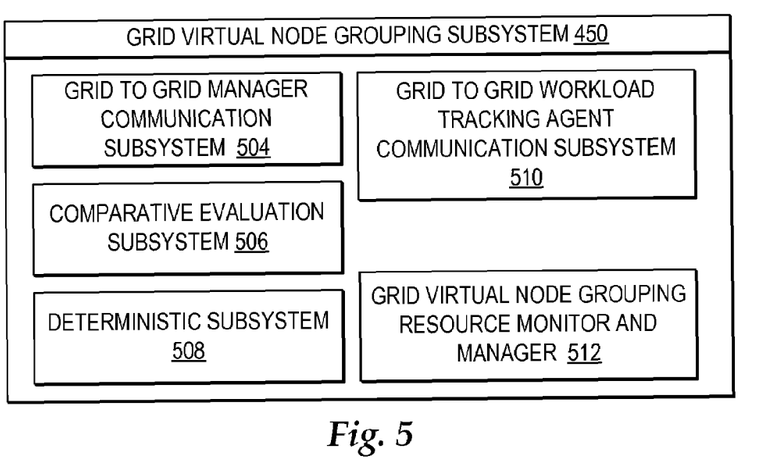
FIG. 5 is a block diagram depicting the components of the grid virtual node grouping subsystem distributed among the grid management system for a grid environment.

With reference now to FIG. 5, there is depicted a block diagram of the components of the grid virtual node grouping subsystem distributed among the grid management system for a grid environment in accordance with the method, system, and program of the present invention. As depicted, grid virtual node grouping subsystem 450 includes multiple subsystem controllers that may be distributed among grid managers and other modules included in the grid management system for a grid environment. In addition, the controllers within grid virtual node grouping subsystem 450 may be incorporated together or individually into modules enabled to manage a grid environment.

Grid virtual node grouping subsystem 450 includes a grid to grid manager communication subsystem 504. In general, grid to grid manager communication subsystem 504 enables communication between grid managers of physically disparate grids, such as Grid A 430 and Grid B 432 in FIG. 4. More specifically, grid to grid manager communication subsystem 504 is incorporated into existing grid managers or grid schedulers within a grid environment to enable communication between grid managers of physically disparate grids and enable integration of resource nodes from one physical grid to be temporarily or permanently managed by another grid manager building a virtual grid node grouping.

In one example of grid virtual node grouping subsystem 504, a local grid manager for a grid including grid to grid manager communication subsystem 504, such as GM 410 for Grid B 432, initiates the query to other grid managers for external resources in an effort to build a low cost, secure virtual node grouping. In particular, GM 410 may query all other grid managers that include grid to grid manager communication subsystem 504. Once GM 410 locates available external resources, then GM 410 will retain responsibility for the external resources from node group formation until node group deconstruction.

To actually enable integration of resources nodes into a virtual grid node group, the grid manager responsible for initiating the virtual grid node group may also be responsible for managing network addressing and configuration changes required to add external resource nodes into a local virtual node grouping. Thus, for example, grid to grid manager communication subsystem 504 within the initiating GM 410 may add Internet Protocol (IP) address aliases to the network cards of each of the resource nodes, such as RS 414, added from external grids so that the external resource nodes appear as part of the local virtual grid node group.

In addition, grid virtual node grouping subsystem 450 includes a grid to grid workload tracking agent communication subsystem 510. A grid workload tracking agent may track real-time usage and performance of a particular group of resources. In one embodiment, grid to grid workload tracking agent communication subsystem 510 enables communication of between grid workload tracking agents. In another embodiment, each grid manager receives real-time usage and performance of a selection of resources managed by each grid manager and grid managers relay the workload information to one another through grid to grid manager communication subsystem 504.

Further, grid virtual node grouping subsystem 450 includes a deterministic subsystem 508. In general, deterministic subsystem 508 determines when it is necessary or desirable to create or dismantle virtual node groupings. In particular, when a grid job is detected, deterministic subsystem 508 analyzes real-time grid activity and conditions, as received from the grid workload agents and other monitoring agents, in addition to business based policies and rules for the job and the grid environment, to determine whether to build a virtual node grouping. In one example, deterministic subsystem 508 first performs an analysis of the real-time grid activity to determine the lowest cost group of resources available to handle the job. Then, deterministic subsystem 508 further analyzes the low cost options based on additional business based criteria including, but not limited to, the current local grid activity levels, the current local grid resource availability, the priority of the new job, the client relationship with the job submitter, and the expected duration of the new job. As a result of the analysis, deterministic subsystem 508 may a decision such as, but not limited to, deciding to add or convert new local grid resources rather than create a new virtual node group, deciding to add or convert local resources for inclusion in a virtual node group, or deciding to create a virtual node group using only remote grid resources that are managed as local resources. In one embodiment, as an alternative to incorporation in a grid manager or independent module, deterministic subsystem 508 may be incorporated into a grid resource allocation agent that specifically controls the allocation and de-allocation of resources within a grid environment.

In addition, grid virtual node grouping subsystem 450 includes a comparative evaluation subsystem 506. In general, comparative evaluation subsystem 506 enables determination of which virtual node grouping is most efficient and cost effective if deterministic subsystem 508 determines that a virtual node grouping should be built and multiple groups are available. In particular, comparative evaluation subsystem 506 may access the costs and time constraints of available nodes and determine the best grouping of nodes based on job requirements, costs, real-time grid conditions, and business policy based criteria. In one embodiment, to access information needed to select a cost effective grouping of nodes, comparative evaluation subsystem 506 may communicate with grid managers, as previously described, and may additionally communicate with grid pricing controllers that determining current pricing for resources within a grid environment and grid resource allocation agents that control and schedule the allocation and de-allocation of resources within a grid environment.

Further, grid virtual node grouping subsystem 450 includes a grid virtual node grouping resource monitor and manager 512. In general, grid virtual node grouping resource monitor and manager 512 is responsible for monitoring and managing a virtual node grouping once the virtual node grouping is built. Grid virtual node grouping resource monitoring and manager 512 may be incorporated within the grid manager and may interface with workload tracking agents to track the completion of the job that initiated the building of the virtual node grouping and notify deterministic subsystem 508 when the job is complete so that the virtual node grouping can be dismantled if no longer necessary.

Figure 6:
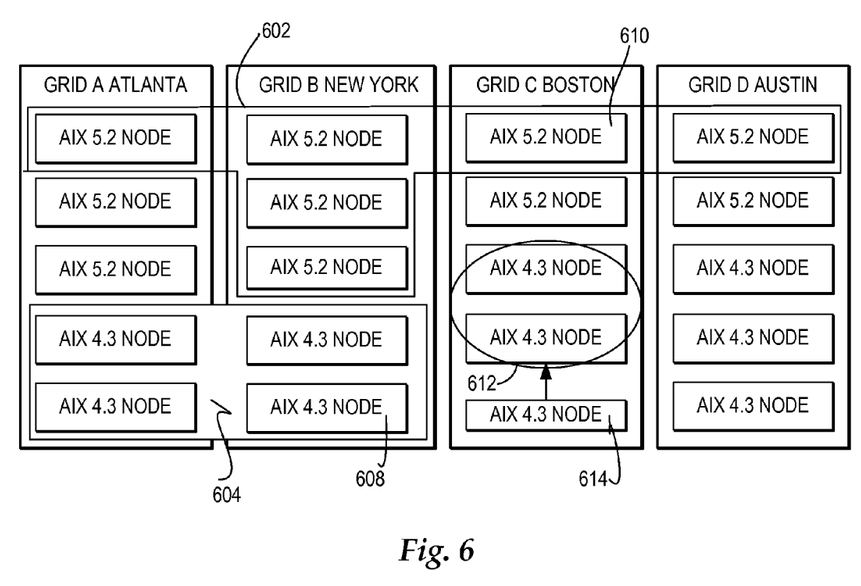
FIG. 6 is a block diagram depicting an illustrative example of the built local resource node groupings.

Referring now to FIG. 6, there is depicted an illustrative example of the built local resource node groupings in accordance with the method, system, and program of the present invention. In the example, resource nodes from four physically disparate grids, managed by four physically disparate grid managers, are depicted. In particular, a Grid A includes resources physically located in Atlanta, a Grid B includes resources physically located in New York, a Grid C includes resources physically located in Boston, and a Grid D includes resources physically located in Austin.

For purposes of example, resources nodes providing one of two types of operating system environments, are described. In particular, for purposes of the example, a resource node may be allocated to providing a platform for AIX 4.3, such as resource node 608, or AIX 5.2, such as resource node 610.

In one example, Grid C receives a job requiring eight concurrently available AIX 5.2 resource nodes for an execution environment. Grid C only includes two local AIX 5.2 resource nodes. The grid manager for Grid C may communicate with the grid managers of Grids A, B and D, through the grid virtual node grouping subsystem, to determine whether additional AIX 5.2 resource nodes are available and determine the most cost effective and policy compliant virtual node grouping to build. In the example, a virtual node grouping 602 is managed locally by the grid manager for Grid C, but includes remote resource nodes from Grids A, B and D. Once Grid C completes the job, then the grid manager for Grid C may dismantle virtual node grouping 602 and return the remote resource nodes to the grid managers for Grids A, B and D.

In another example, Grid B receives a job requiring eight concurrently available AIX 4.3 resource nodes for an execution environment. Grid B only includes two local AIX 4.3 resource nodes. The grid manager for Grid B may communicate with the grid managers of Grids A, C, and D through the grid virtual node grouping subsystem, to determine whether additional AIX 4.3 resource nodes are available and determine the most cost effective and policy compliant virtual node grouping to build. In the example, the comparative evaluation subsystem may access availability, pricing, and real-time workload of the AIX 4.3 resource nodes in Grids A, C, and D; Table 1 illustrates an example of the comparative values that may be determined by the comparative evaluation subsystem from the availability, pricing, and real-time workload. Based on the availability, pricing, and workload (calculated into wait time and run time), in addition to policies, the comparative evaluation subsystem selects to add the AIX 4.3 resource nodes available from Grid A to build a virtual node grouping 604 that is locally managed within Grid B. It is important to note that comparative evaluation may include comparisons of multiple factors, such as cost and times, or a single factor, such as just cost.

TABLE 1

Comparative Evaluation Calculations

| | Nodes Available | Wait Time | Run Time | Current Cost |
|---|---|---|---|---|
| Grid A | 2 | 000 min | 100 min | $800 |
| Grid C | 3 | 030 min | 70 min | $900 |
| Grid D | 3 | 010 min | 100 min | $800 |

In yet another example, Grid C receives a job requiring three concurrently available AIX 5.2 resource nodes for an execution environment. Locally, within Grid C, a node grouping 612 includes two AIX 4.3 nodes. The grid manager for Grid C may initiate the grid virtual node grouping subsystem to determine whether to build a virtual node grouping with additional local resource nodes or additional external resource nodes. In the example, the grid manager for Grid C determines that AIX 4.3 node 614 should be added to virtual node grouping 612 to handle the job.

Figure 7:
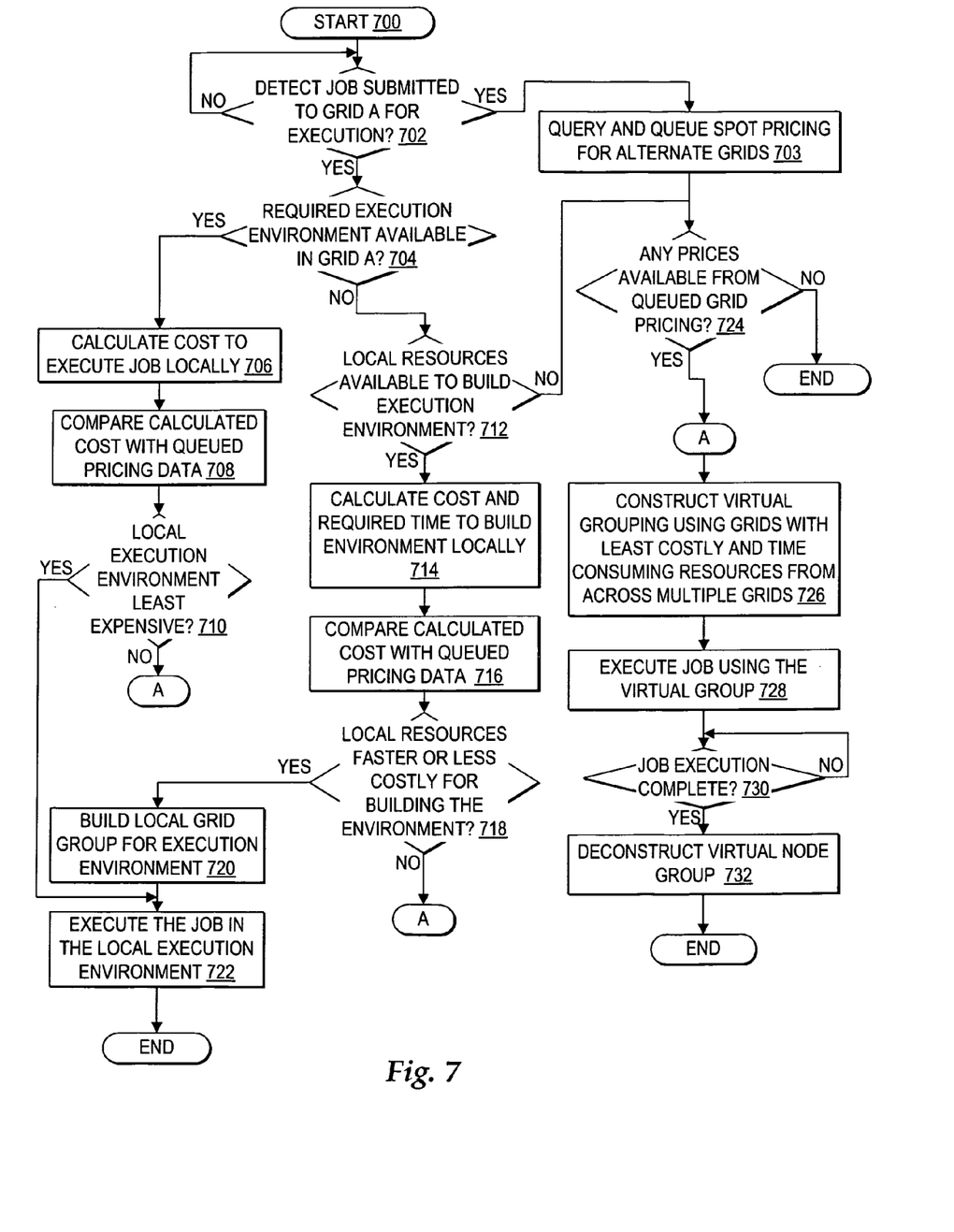
FIG. 7 depicts a high level logic flowchart of a process and program for determining whether to build a local, virtual grid node grouping or use an existing grouping and determining which resource nodes to include in the grouping.

With reference now to FIG. 7, there is depicted a high level logic flowchart of a process and program for determining whether to build a local grid node grouping or use an existing grouping and determining which resource nodes to include in the grouping in accordance with the method, system, and program of the present invention. As depicted, the process starts at block 700 and thereafter proceeds to block 702. Block 702 depicts a determination whether a grid manager for grid A detects a job submitted for execution. When a grid manager for grid A detects a job submitted for execution, the grid manager initiates block 703, to query and queue spot pricing for use of resources from alternate grids to build the execution environment for the job, which is described in FIG. 8. In addition, when a grid manager for grid A detects a job submitted for execution, the process passes to block 704.

Block 704 depicts a determination whether the required execution environment for execution of the job is already built and available in grid A. If the required execution environment is already available in grid A, then the process passes to block 706. Block 706 depicts calculating the cost to execute the job locally within an execution environment. Next, block 708 depicts comparing the calculated cost with the queued pricing data complied as described in FIG. 8. Thereafter, block 710 depicts a determination whether the local execution environment is the least expensive. If the local execution environment is the least expensive, then the process passes to block 722. Block 722 depicts executing the job in the local execution environment, and the process ends. Otherwise, at block 710, if the local execution environment is not the least expensive, then the process passes to block 726 and proceeds as will be further described.

Figure 8:
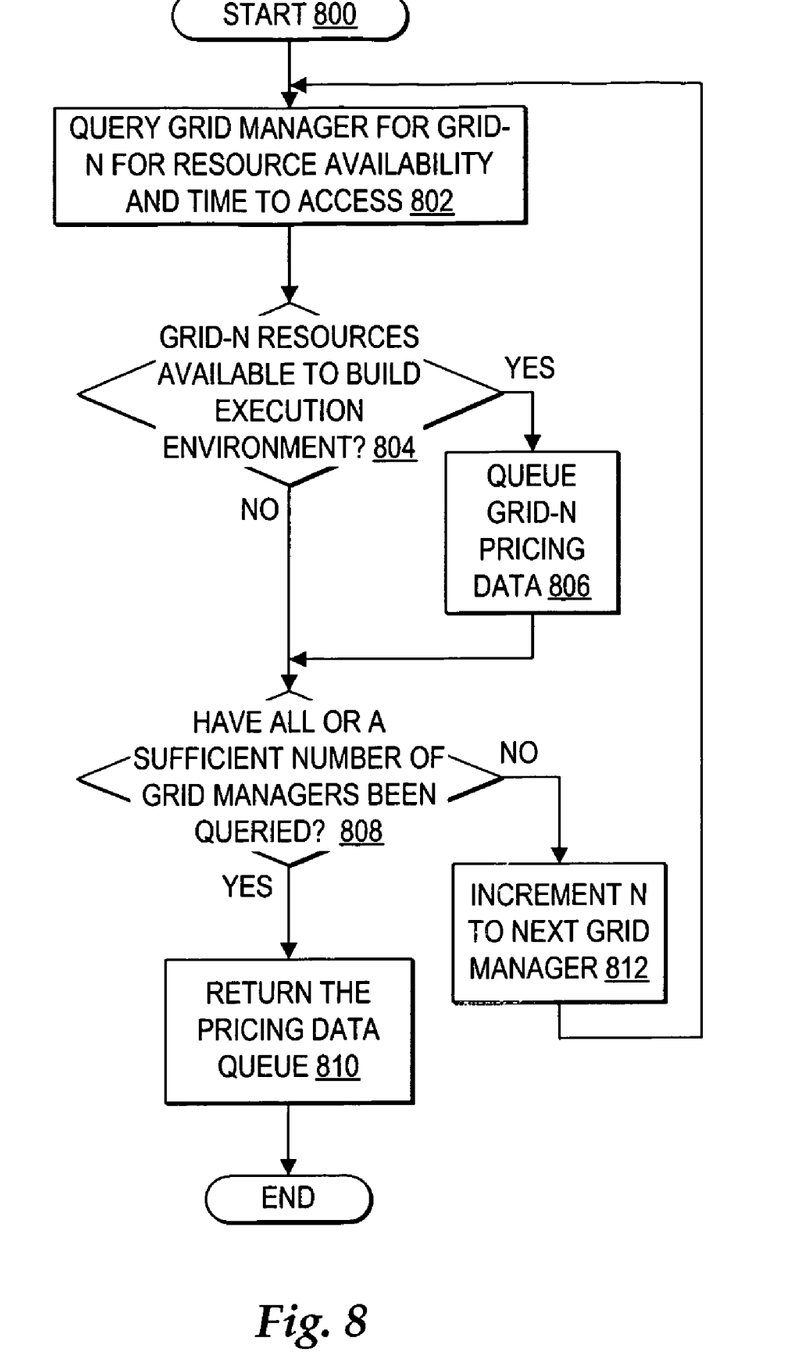
FIG. 8 is a high level logic flowchart depicting a process and program for controlling the querying of other disparate grid resource groups for available resources for constructing a virtual group of resources.

Returning to block 704, if the required execution environment is not already available in grid A, then the process passes to block 712. Block 712 depicts a determination whether grid A includes local resources that are available to build an execution environment. If grid A does not include local resources available to build the execution environment, then the process passes to block 724. Block 724 depicts a determination whether any prices are available in the grid pricing queue. If prices are not available in the pricing queue, then the process ends. If prices are available in the pricing queue, then the process passes to block 726, and proceeds as will be further described.

Returning to block 712, if there are local resources available to build the execution environment required for the job, then the process passes to block 714. Block 714 depicts calculating the cost and required time to locally build the grouping of nodes for the execution environment. Next, block 716 depicts comparing the calculated cost with the queued pricing data. Thereafter, block 718 depicts a determination whether the local resources are faster less costly for building the node group for the executing environment. If the local resources are not faster or less costly for building the node group for the execution environment for the job, then the process passes to block 726. If the local resources are faster or less costly for building the node group for the execution environment for the job, then the process passes to block 720. Block 720 depicts building a local grid resource group for the execution environment, then block 722 depicts executing the job in the local execution environment, and the process ends.

Block 726 depicts constructing a virtual node grouping for an execution environment using grids with the least costly and time consuming resources from across the multiple grids returning pricing and availability of resource information. Next, block 728 depicts executing the job within the virtual group. Thereafter, block 730 depicts a determination whether the job execution is completed. Once the job execution is completed, block 732 depicts deconstructing the virtual resource group, and the process ends.

Referring now to FIG. 8, there is depicted a high level logic flowchart of a process and program for controlling the querying of other disparate grid resource groups for available resources for constructing a virtual group of resources in accordance with the method, system, and program of the present invention. As depicted, the process start at block 800 and thereafter proceeds to block 802. Block 802 depicts querying a grid manager for grid-N for resource availability and time to access available resources. Next, block 804 depicts a determination whether the grid-N resources are available to build the execution environment. If resources from grid-N are available, then the process passes to block 806. Block 806 depicts queuing the grid-N pricing data, and the process passes to block 808. Otherwise, at block 804, if resources from grid-N are available, then the process passes to block 808.

Block 808 depicts a determination whether all or a sufficient number of grid managers have been queried for resource availability. If all or a sufficient number of grid managers have been queried for resource availability, then the process passes to block 810. Block 810 depicts returning the pricing data queue to the requesting grid manager, and the process ends. Otherwise, at block 808, if all or a sufficient number of grid managers have not been queried for resource availability, then the process passes to block 812. Block 812 depicts incrementing N to query the next grid manager in block 802.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method for building virtual node groupings within a grid environment, comprising:

detecting a grid job at a particular grid manager from among a plurality of grid managers within a grid environment, wherein said grid job requires a particular degree of parallelism for execution, wherein a plurality of resource nodes within said grid environment are identified in physically disparate groups each managed by one from among said plurality of grid managers through a plurality of web services implemented within a web services layer extended by an open grid services infrastructure atop a grid service layer comprising at least one grid service implemented within an open grid services architecture, wherein each of said plurality of grid managers comprises a grid manager communication subsystem for communicating between said plurality of grid managers, wherein said particular grid manager locally manages a first selection of resource nodes from among said plurality of resource nodes within said grid environment within a particular physical location, wherein at least one additional local grid manager manages a second selection of resource nodes from among said plurality of resource nodes within said particular physical location, wherein at least one remote grid manager manages a third selection of resource nodes from among said plurality of resource nodes within a remote physical location;

responsive to said particular grid manager detecting that insufficient resources are available for a required execution environment for said grid job from said first selection of resource nodes, accessing, from said plurality of grid managers through said grid manager communication subsystem, a current availability, a current wait time, a current run time, and a current cost for each of said plurality of resource nodes within said grid environment;

responsive to detecting said second selection of resource nodes are available to build said required execution environment for said grid job from said current availability returned from said at least one additional local grid manager, calculating a total local run time from said current wait time and current run time for said second selection of resources and calculating a total local cost from said current cost for said second selection of resources for building said required execution environment with said second selection of resource nodes;

comparing said total local run time and said total local cost with a remote time calculated from said current wait time and said current run time for said third selection of resources and a remote cost calculated from said current cost for said third selection of resources;

responsive to determining at least one of said total local run time less than said remote time and said total local cost less than said remote cost, selecting said second selection of resource nodes from among said plurality of resource nodes to build into a virtual node grouping for said required execution environment for executing said grid job;

building said virtual node grouping by said particular grid manager through said grid manager communication subsystem by adding an Internet Protocol address alias for said virtual node grouping to a separate network card of each of said second selection of resource nodes to acquire temporary management control over said second selection of resource nodes from said at least one additional local grid manager for a duration of execution of said grid job within said virtual node grouping;

responsive to determining said total run time slower than said remote time and said total local cost greater than said remote cost, selecting said third selection of resource nodes to build into said virtual node grouping for said required execution environment;

building said virtual node grouping by said particular grid manager through said grid manager communication subsystem by adding said Internet Protocol address alias for said virtual node grouping to each separate network card of each of said third selection of resource nodes to acquire temporary management control over said third selection of resource nodes from said at least one remote grid manager; and responsive to the grid job execution completed, deconstructing said virtual node grouping.

2. The computer-implemented method according to claim 1 for building virtual node groupings within a grid environment, wherein said second selection of resource nodes comprises at least one resource node from said first selection from among said plurality of resource nodes.

3. The computer-implemented method according to claim 1 for building virtual node groupings within a grid environment, wherein said second selection of resource nodes comprises at least one resource node from a first physical location and at least one resource node from a second physical location.

4. The computer-implemented method according to claim 1 for building virtual node groupings within a grid environment, wherein said plurality of resource nodes within said grid environment are managed by a particular enterprise.

5. A system for building virtual node groupings within a grid environment, comprising:

a grid environment comprising a plurality of resource nodes identified in physically disparate groups each managed by one from among said plurality of grid managers through a plurality of web services implemented within a web services layer extended by an open grid services infrastructure atop a grid service layer comprising at least one grid service implemented within an open grid services architecture, wherein each of said plurality of grid managers comprises a grid manager communication subsystem for communicating between said plurality of grid managers;

a particular grid manager from among said plurality of grid managers that locally manages a first selection of resource nodes from among said plurality of resource nodes within a particular physical location of said grid environment, wherein at least one additional local grid manager from among said plurality of grid managers manages a second selection of resource nodes from among said plurality of resource nodes within said particular physical location, wherein at least one remote grid manager from among said plurality of grid managers manages a third selection of resource nodes from among said plurality of resource nodes within a remote physical location;

said particular grid manager further comprising:

means for detecting a grid job that requires a particular degree of parallelism for execution within said grid environment;

means, responsive to said particular grid manager detecting that insufficient resources are available for a required execution environment for said grid job from said first selection of resource nodes, for accessing, from said plurality of grid managers through said grid manager communication subsystem, a current availability, a current wait time, a current run time, and a current cost for each of said plurality of resource nodes within said grid environment;

means, responsive to detecting said second selection of resource nodes are available to build said required execution environment for said grid job from said current availability returned from said at least one additional local grid manager, for calculating a total local run time from said current wait time and current run time for said second selection of resources and calculating a total local cost from said current cost for said second selection of resources for building said required execution environment with said second selection of resource nodes;

means for comparing said total local run time and said total local cost with a remote time calculated from said current wait time and said current run time for said third selection of resources and a remote cost calculated from said current cost for said third selection of resources;

means, responsive to determining at least one of said total local run time less than said remote time and said total local cost less than said remote cost, for selecting said second selection of resource nodes from among said plurality of resource nodes to build into a virtual node grouping for said required execution environment for executing said grid job;

means for building said virtual node grouping by said particular grid manager through said grid manager communication subsystem by adding an Internet Protocol address alias for said virtual node grouping to a separate network card of each of said second selection of resource nodes to acquire temporary management control over said second selection of resource nodes from said at least one additional local grid manager for a duration of execution of said grid job within said virtual node grouping;

means, responsive to determining said total run time slower than said remote time and said total local cost greater than said remote cost, for selecting said third selection of resource nodes to build into said virtual node grouping for said required execution environment;

means for building said virtual node grouping by said particular grid manager through said grid manager communication subsystem by adding said Internet Protocol address alias for said virtual node grouping to each separate network card of each of said third selection of resource nodes to acquire temporary management control over said third selection of resource nodes from said at least one remote grid manager; and means, responsive to the grid job execution completed, for deconstructing said virtual node grouping.

6. The system according to claim 5 for building virtual node groupings within a grid environment, wherein said second selection of resource nodes comprises at least one resource node from said first selection from among said plurality of resource nodes.

7. The system according to claim 5 for building virtual node groupings within a grid environment, wherein said second selection of resource nodes comprises at least one resource node from a first physical location and at least one resource node from a second physical location.

8. The system according to claim 5 for building virtual node groupings within a grid environment, wherein said plurality of resource nodes within said grid environment are managed by a particular enterprise.

9. A computer executable program product comprising computer executable instructions tangibly embodied on a non-transitory volatile or non-volatile computer readable medium that when executed by said computer perform the method steps for building virtual node groupings within a grid environment, comprising:

enabling detection of a grid job at a particular grid manager from among a plurality of grid managers within a grid environment, wherein said grid job requires a particular degree of parallelism for execution, wherein a plurality of resource nodes within said grid environment are identified in physically disparate groups each managed by one from among said plurality of grid managers through a plurality of web services implemented within a web services layer extended by an open grid services infrastructure atop a grid service layer comprising at least one grid service implemented within an open grid services architecture, wherein each of said plurality of grid managers comprises a grid manager communication subsystem for communicating between said plurality of grid managers, wherein said particular grid manager locally manages a first selection of resource nodes from among said plurality of resource nodes within said grid environment within a particular physical location, wherein at least one additional local grid manager manages a second selection of resource nodes from among said plurality of resource nodes within said particular physical location, wherein at least one remote grid manager manages a third selection of resource nodes from among said plurality of resource nodes within a remote physical location;

responsive to said particular grid manager detecting that insufficient resources are available for a required execution environment for said grid job from said first selection of resource nodes, controlling access, from said plurality of grid managers through said grid manager communication subsystem, a current availability, a current wait time, a current run time, and a current cost for each of said plurality of resource nodes within said grid environment;

responsive to detecting said second selection of resource nodes are available to build said required execution environment for said grid job from said current availability returned from said at least one additional local grid manager, calculating a total local run time from said current wait time and current run time for said second selection of resources and calculating a total local cost from said current cost for said second selection of resources for building said required execution environment with said second selection of resource nodes;

comparing said total local run time and said total local cost with a remote time calculated from said current wait time and said current run time for said third selection of resources and a remote cost calculated from said current cost for said third selection of resources;

responsive to determining at least one of said total local run time less than said remote time and said total local cost less than said remote cost, controlling selection of said second selection of resource nodes from among said plurality of resource nodes to build into a virtual node grouping for said required execution environment for executing said grid job;

controlling the building of said virtual node grouping by enabling said particular grid manager through said grid manager communication subsystem by adding an Internet Protocol address alias for said virtual node grouping to a separate network card of each of said second selection of resource nodes to acquire temporary management control over said second selection of resource nodes from said at least one additional local grid manager for a duration of execution of said grid job within said virtual node grouping;

responsive to determining said total run time slower than said remote time and said total local cost greater than said remote cost, selecting said third selection of resource nodes to build into said virtual node grouping for said required execution environment;

building said virtual node grouping by said particular grid manager through said grid manager communication subsystem by adding said Internet Protocol address alias for said virtual node grouping to each separate network card of each of said third selection of resource nodes to acquire temporary management control over said third selection of resource nodes from said at least one remote grid manager; and responsive to the grid job execution completed, deconstructing said virtual node grouping.

* * * * *